United States Patent
Nishimura et al.

(10) Patent No.: US 6,904,228 B2
(45) Date of Patent: Jun. 7, 2005

(54) RECORDING AND REPRODUCING DEVICE

(75) Inventors: Shunji Nishimura, Nara (JP); Hiroyuki Fujimoto, Nara (JP); Tadashi Watanabe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1094 days.

(21) Appl. No.: 09/735,948

(22) Filed: Dec. 13, 2000

(65) Prior Publication Data

US 2001/0043789 A1 Nov. 22, 2001

(30) Foreign Application Priority Data

Dec. 17, 1999 (JP) ............................................. 11-358555

(51) Int. Cl.[7] .............................................. H04N 5/91
(52) U.S. Cl. ........................................ 386/69; 386/95
(58) Field of Search ............................ 386/46, 52, 55, 386/70, 69, 95, 125–126, 68

(56) References Cited

U.S. PATENT DOCUMENTS

| | | | | |
|---|---|---|---|---|
| 5,719,637 A | * | 2/1998 | Ohkura et al. ................. 725/56 |
| 5,740,304 A | * | 4/1998 | Katsuyama et al. ......... 386/125 |
| 5,796,910 A | * | 8/1998 | Nagano et al. ................ 386/70 |
| 6,064,380 A | * | 5/2000 | Swenson et al. .............. 725/87 |
| 6,480,669 B1 | * | 11/2002 | Tsumagari et al. ............ 386/95 |
| 6,501,902 B1 | * | 12/2002 | Wang .......................... 386/52 |
| 6,847,778 B1 | * | 1/2005 | Vallone et al. ................ 386/46 |

FOREIGN PATENT DOCUMENTS

JP BA 7-191978 7/1995

* cited by examiner

*Primary Examiner*—Vincent Boccio
(74) *Attorney, Agent, or Firm*—David G. Conlin; Edwards & Angell, LLP

(57) ABSTRACT

A recording and reproducing device having a detector, which detects the beginning of inputting a string of characters associated with a user input while recording or reproducing video and/or audio data, storing marking position data with reference to the beginning of the inputting characters of the character string, at the point in time detected by the detector. Wherein a reproducing operation of the recorded data, can be done at a starting point specified pointing to character strings. This allows the user to select character strings generated in a character display area, whereby the recorded video data can be reproduced from the positions stored with reference to user selected character strings.

6 Claims, 14 Drawing Sheets

- 261 — REPORT ON BALANCE SHEET FOR THIS MONTH
- 262 — PRINCIPLE ON BUSINESS FOR NEXT MONTH
- 263 — ORIENTATION OF NEW PRODUCTS
- 264 — EXPLANATION ON APPEARING POINTS
- 265 — DEVELOPMENT STRATEGY

RECORDING AND REPRODUCING DEVICE

BACKGROUND OF THE INVENTION

The present invention relates to a recording and reproducing device capable of a recording and reproducing video and audio data and more specifically to a recording and reproducing device allowing inputting of characters while recording or reproducing video and audio data.

Recently, information processing devices such as personal computers have been developed, which are capable of processing not only document and image data but also audio and video data. In this connection, there have been a number of methods for dealing with document/image data in relation with audio/video data on the information processing devices.

For example, Japanese Laid-open Patent Publication No. 7-191978 discloses a document processing device that can record audio data on a specifically marked position within document data and can output the audio data when an instruction is given for reproducing the audio data in the marked position. The operation of the device is briefly outlined as follows: When recording audio data, a recording position corresponding to a position in a document data is specified by a position specifying means. The audio data is then input in timing with the specified position and recorded. The audio recording means records the audio data correspondingly to the specified position of the document data. When reproducing the audio data, the specifying means instructs the beginning of reproducing audio data by specifying a mark indicated thereat. The audio data corresponding to the mark for audio reproduction is read from the audio recording means and output.

On the other hand, some video recording and reproducing applications used on personal computers provides such a user interface that sets a start point of video reproduction by using an indicator (a progress bar) for indicating a relative position of currently reproducing portion in a total time of an entire record.

A conventional video editing device can automatically recognize a scene end (a cut point) of video, indicate a scene end by a plurality of contracted images and edit video data by copying, cutting (deleting), pasting and transferring on the contracted images.

The document processing device described in Japanese Laid-open Publication No. 7-191978 can record any audio data on any desired position within document data and, moreover, can recognize the audio record position by a mark and output the audio data related to the corresponding document data by specifying the reproduction of the audio data with the mark.

The above-described document processing device is effective to add audio data to already recorded document data, but it is not suited to add characters to already recorded audio data.

The user interface using the indicator specifying a video reproducing start in the video recording/reproducing application for a personal computer can not precisely specify a start position when reproducing the video data. In other word, this method cannot easily start the reproduction of the video from a correct portion that the user wants to see first.

The conventional video editing device for editing video data by processing a plurality of contracted images involves problems in connection with a large number of contracted images due to automatic recognition of scene cut points, unrecognizable moderate scene change and difficulty to precisely grasp the scene content by viewing only contracted images.

SUMMARY OF THE INVENTION

A primary object of the present invention is to provide a recording and reproducing device that can easily reproduce recorded audio data and video data beginning from any record position that the user wants to see or listen.

Another object of the present invention is to provide a recording and reproducing device that can easily edit recorded audio data and video data by easily copying, cutting (deleting), pasting and transferring objective elements.

Another object of the present invention is to provide a recording and reproducing device comprising: a recording/reproducing means for recording video or audio data and reproducing the recorded data; an input area specifying means for specifying an area for inputting characters therein; a character inputting means for inputting characters in the area specified by the input area specifying means; a displaying means for displaying characters input by the character inputting means; a character inputting start detecting means for detecting the beginning of inputting characters by the character inputting means while recording or reproducing data by the recording/reproducing means; and a recording/reproducing position storing means for relationally storing: information indicating a position of recording/reproducing data by the recording/reproducing means at a time point of detection of the character inputting start by the character inputting start detecting means; a string of characters inputted by the character inputting means at that time point; and information indicating an area wherein the characters have been inputted, wherein the information indicating the position, the string of characters, and the information indicating the area are related with each other.

Another object of the present invention is to provide a recording and reproducing device, further comprising: a discriminating means for discriminating whether a character inputted by the character inputting means in relation with the position of video or audio data being displayed during the reproduction of recorded data by the recording/reproducing means and information defining the area wherein the character have been inputted are stored in the recording/reproducing position storing means; and a displaying form changing means whereby, when the discriminating means decided the presence of the information stored in the recording/reproducing position storing means, the character or the area is displayed differently in form from other characters or areas.

Another object of the present invention is to provide a recording and reproducing device, further comprising: an area selecting means for selecting one of areas stored in the recording/reproduction position storing means; and a reproduction instructing means for instructing the recording/reproducing means to reproduce video or audio data from a recording/reproducing position stored with reference to a corresponding area selected by the area selects means.

Another object of the present invention is to provide a recording and reproducing device, wherein the area selecting means automatically selects one of areas stored in the record/reproduction position storing means one by one in the stored order.

Another object of the present invention is to provide a recording and reproducing device, further comprising: an edition instructing means for instructing edition by deleting a character stored in the record/reproduction position storing means or copying or transferring a character to another position thereof; and an editing means for deleting a character stored in the record/reproduction position storing means or copying or transferring a character to another position thereof in response to instruction from the edition instructing means and for deleting an information indicating the position corresponding to the deleted character in the record/reproduction position storing means or storing the copied/transferred character with reference to information indicating an area whereto the character has been copied/transferred.

PREFERRED EMBODIMENT OF THE INVENTION

A preferred embodiment of the present invention will be described below: In this specification, the term "video" means "moving pictures and audio data" but it may be only "moving pictures or audio data". The term "video recording" means "recording moving pictures and recording audio data" but it may be only "recording moving pictures or recording audio data".

Figure 1:
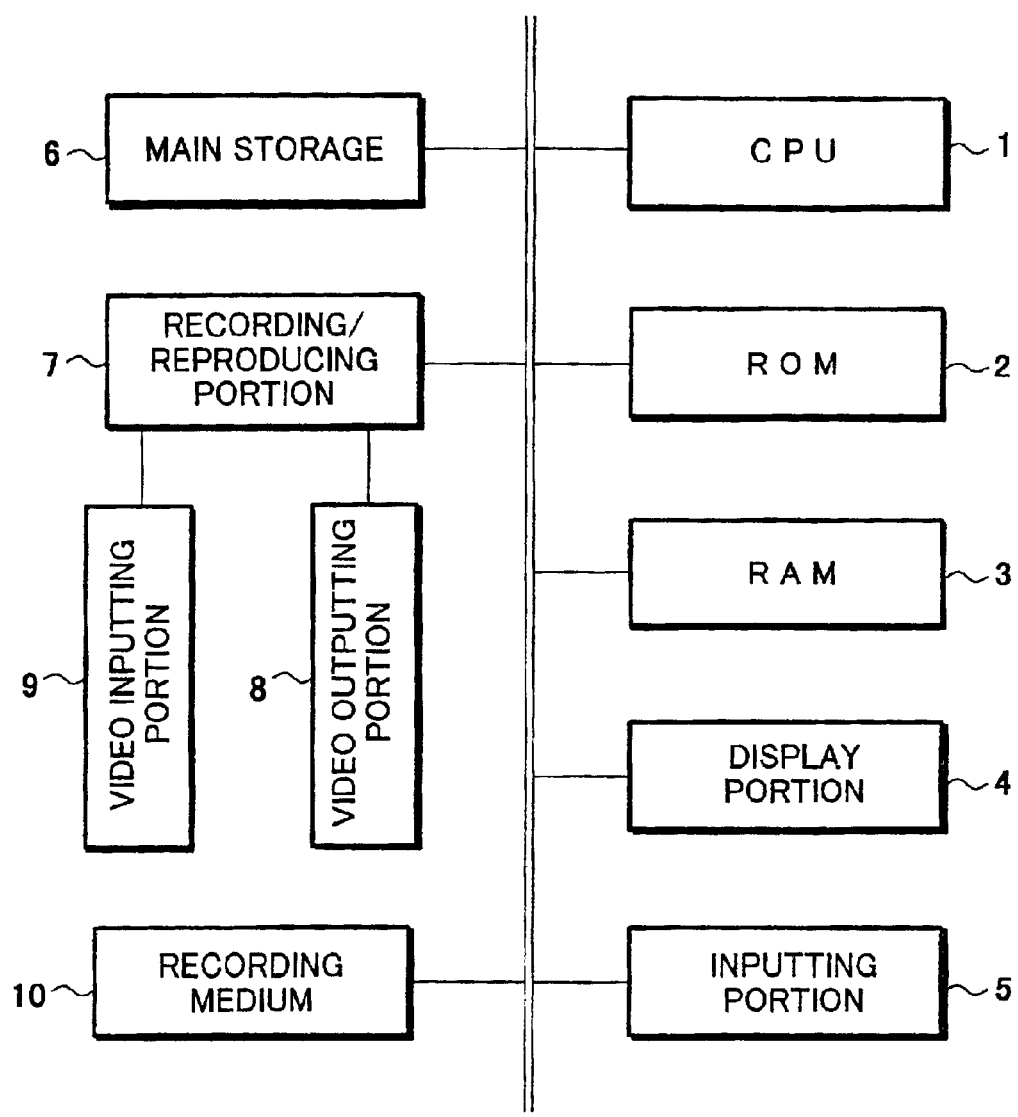
FIG. 1 is a block diagram of a recording and reproducing device according to the present invention.

FIG. 1 is a block diagram showing a structure of a recording and reproducing device according to an embodiment of the present invention. In FIG. 1, the recording and reproducing device comprises a CPU (main control unit) 1, a ROM (read-only memory) 2, a RAM (random-access memory) 3, a display portion 4, an inputting portion 5, a main storage 6, recording/reproducing portion 7, video outputting portion 8, video inputting portion 9 and a recording medium 10.

The main control unit CPU 1 controls a whole system of the recording and reproducing device. It also controls document-processing operations including Japanese Hiragana-to-Kanji conversion and the recording and reproducing portion 7. The ROM 2 stores a control program for operating CPU 1 (i.e., programs for realizing flowcharts of FIGS. 6–7, 9–10 or 12–15 and other applications) as well as dictionaries for Japanese Kana-to-Kanji conversion and character recognition. The RAM 3 is a working memory for storing data and variables necessary for operation of the CPU 1.

The display 4 is used for displaying the output of the recording and reproducing device. It displays a word-processor application (for editing documentary texts), an ink word-processor application (for editing an image document) and a control window for control a recorder (video-recording/reproducing application).

The inputting portion 5 is an inputting means that is used by the user for inputting characters and commands for executing the document-text editing application or the image-document editing application. The inputting means may be, for example, a keyboard, a touch panel and a mouse, etc. A keyboard has a set of character keys with the addition of a number of function keys such as cursor-keys and so on.

The main storage 6 is used for storing document inputted by the user and/or receded video data, etc. In the shown embodiment, the main storage 6 consists of a medium capable of storing digital data (e.g., random access memory). However, it may be composed of a tape medium for recording analog data thereon or a plurality of different kinds of storage media.

The recording/reproducing portion 7 is used for recording video data and reproducing the recorded video data. It is connected to the video outputting portion 8 and the video inputting portion 9. The video outputting portion 8 is used for outputting video and audio data. The video outputting portion 8 may serve as the display portion 4. It may also be a video output terminal. The video inputting portion 9 may be a video camera and a microphone or video input terminal.

The recording medium 10 is used for permanently storing video data and document data. It may be, for example, a hard disk, a magneto optical disk or a magnetic tape.

Figure 2:
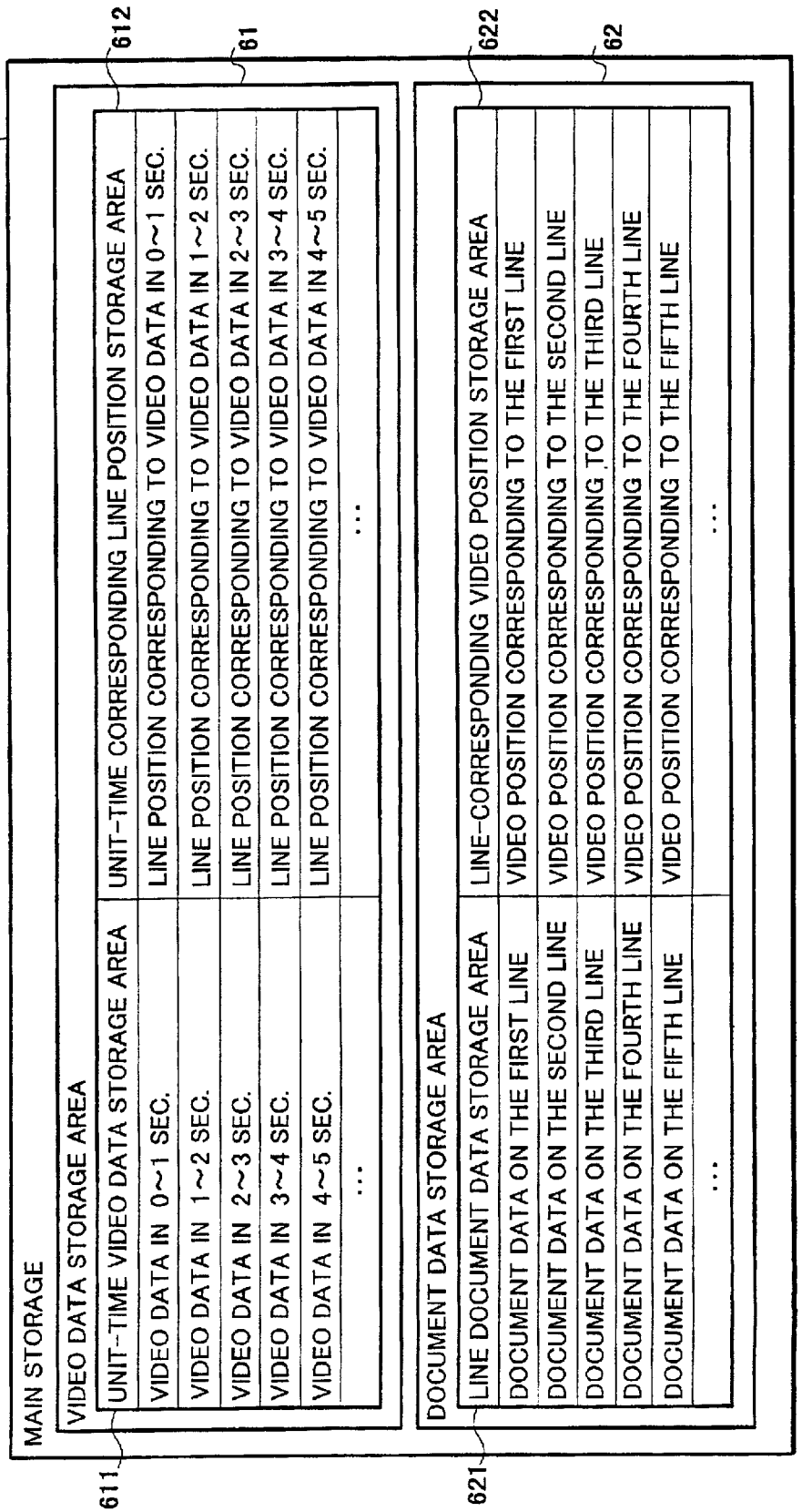
FIG. 2 illustrates a detailed content of a main storage 6.

FIG. 2 is a detailed view of the main storage 6 that having a video data storage area 61 and a document data storage area 62. The video data storage area 61 consists of a pair of sub-areas: one is a unit-time video data storage area 611 for storing video data per unit time and the other is a unit-time corresponding line position storage area 612 for storing each line (row) position corresponding to each video data stored for a unit time in the area 611. The document data storage area 62 consists of a pair of sub-areas: one is a line document data storage area 621 for storing document data (a string of characters) per line (row) and the other is a line-corresponding video position storage area 622 for storing each video data position corresponding to each line (row) of the document data.

Figure 3:
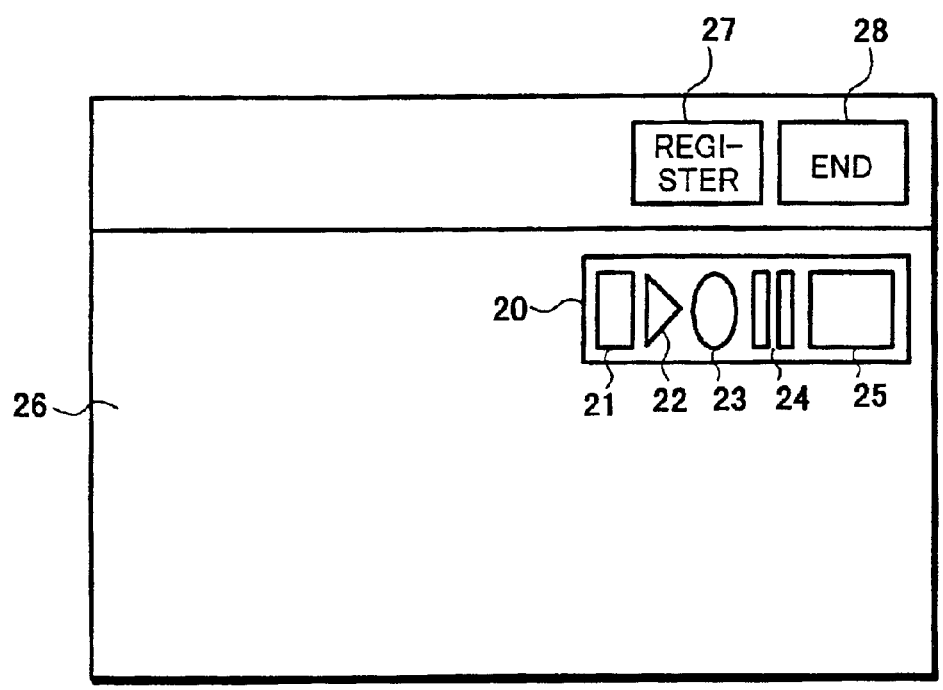
FIG. 3 illustrates an exemplified screen image of a display portion 4.
Figure 4:
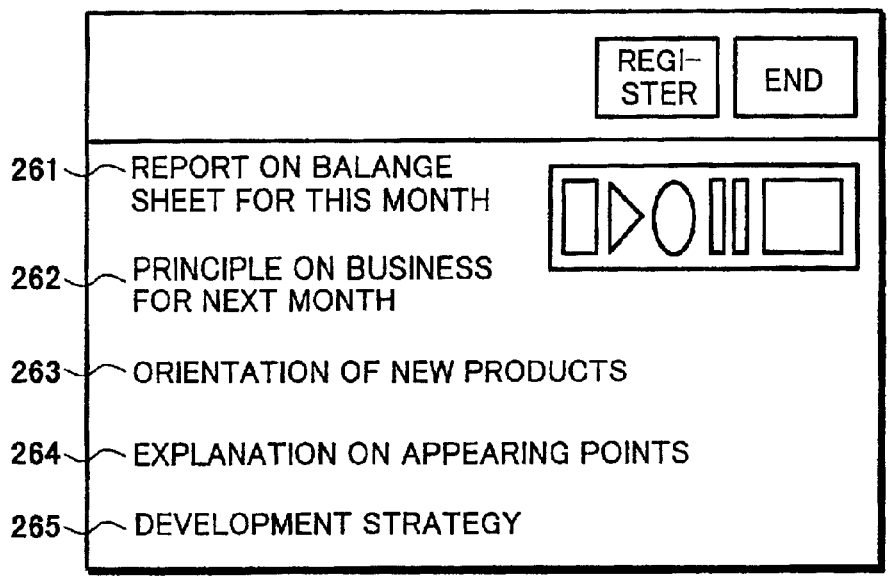
FIG. 4 illustrates an exemplified screen image of a display portion 4.
Figure 5:
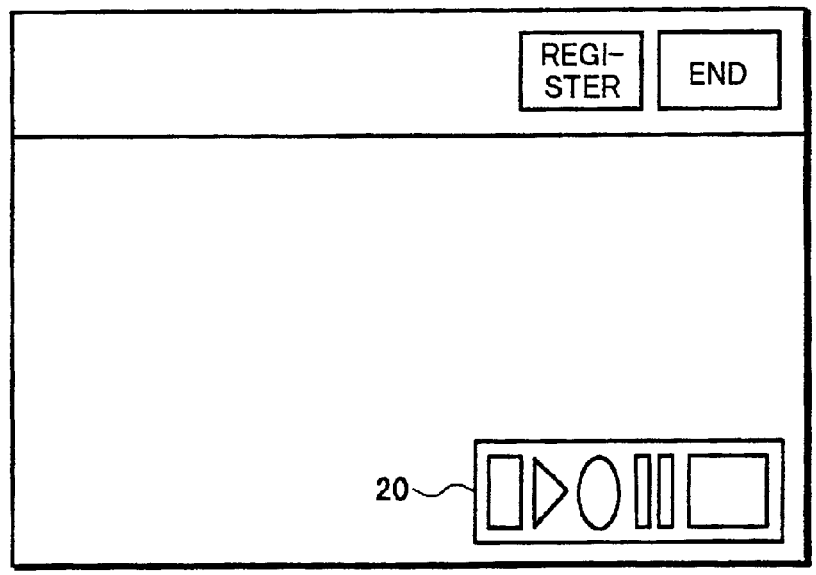
FIG. 5 illustrates an exemplified screen image of a display portion 4.

FIGS. 3 to 5 show exemplary screen images on the display portion 4. FIG. 3 illustrates an initial state of the recording and reproducing device when the word processing application and recorder application are driven on the device. FIG. 4 illustrates a state of the device when the document data is input and displayed thereon.

Once the applications were driven, a control window 20 for controlling the recorder operation appears on a display screen of the display portion 4. The control window 20 contains a "stop" button 21, a "play (reproduce)" button 22, a "video recording" button 23, a "pause" button 24 and a "video recording time" indicator 25. A screen area 26 is an area for displaying inputted document data. By operating a "cursor moving" key of the inputting portion 5, the user moves a cursor on a desired row-and-column position on the screen to input characters therefrom. A "register" button 27 is used for inputting an instruction for recording the input document and recorded video data on the recording medium 10. An "end" button 28 is used for inputting an instruction for finishing the applications. The above buttons can be operated by using a mouse or touch panel of the inputting portion 5.

When, for example, during a conference or negotiations, the user actuated the video "record" button 23 on the display in the state shown in FIG. 3, video data input from the video inputting portion 9 is stored in the video data storage area 611. In this instance, the video data per unit time (with an elapse of a unit time) from the beginning of video recording is stored subsequently in a specified area of the unit-time video data storage area 611.

After the beginning of the video data recording, the user in this case starts inputting characters from the inputting portion 5 by previously positioning the cursor at a desired position on the document inputting area 26 on the display portion 4. Now, the information on a line position pointed by the cursor is stored in a specified area (corresponding to a recording time position at that moment) of the unit-time corresponding line-position storage area 612 and the video recording time-position information is stored in a specified area (corresponding to a specified line position) of the line-corresponding video position storage area 622.

For example, 4 seconds after the beginning of the video recording operation, the user started inputting characters from the third line (row) (line position 263 in FIG. 4) pointed by the cursor. In this instance, information indicating "the third line" is stored in "line position corresponding to video data in 4 to 5 sec.", as shown in FIG. 2, of the unit-time corresponding line position storage area 612. Information indicating the video recording position at that point of time, i.e., "4 seconds after" the beginning of the video recording, is also stored in "video position corresponding to the third line", as shown in FIG. 2, of the line-corresponding video position storage area 622.

On the completion of the conference or the negotiation, the user presses the "stop" button 21 in the window 20 to finish the video recording operation and presses the "register" button 27 to register the data stored in the video data storage area 61 and the document data storage area 62 into the recording medium 10. The video recording can be temporally stopped by pressing the "pause" button 24 on the display screen.

When preparing proceedings or a report, the user can see video data corresponding to a desired line of the document displayed on the display portion by only designating the line. A this time, the video data is read from the unit-time video data storage area 611 and outputted (reproduced) by the video outputting portion 8. For example, by pointing a line position 261 shown in FIG. 4, video data relating to "report on a balance sheet of this month" is read and reproduced. Similarly, by pointing line positions 262, 263, 264 and 265, corresponding video data for the respective line texts is read and reproduced.

FIG. 5 is an exemplary screen image wherein a control window 20 is shown in a lower part of the screen. The control window can be erased and re-displayed by inputting corresponding instructions through the inputting portion 5.

Figure 6:
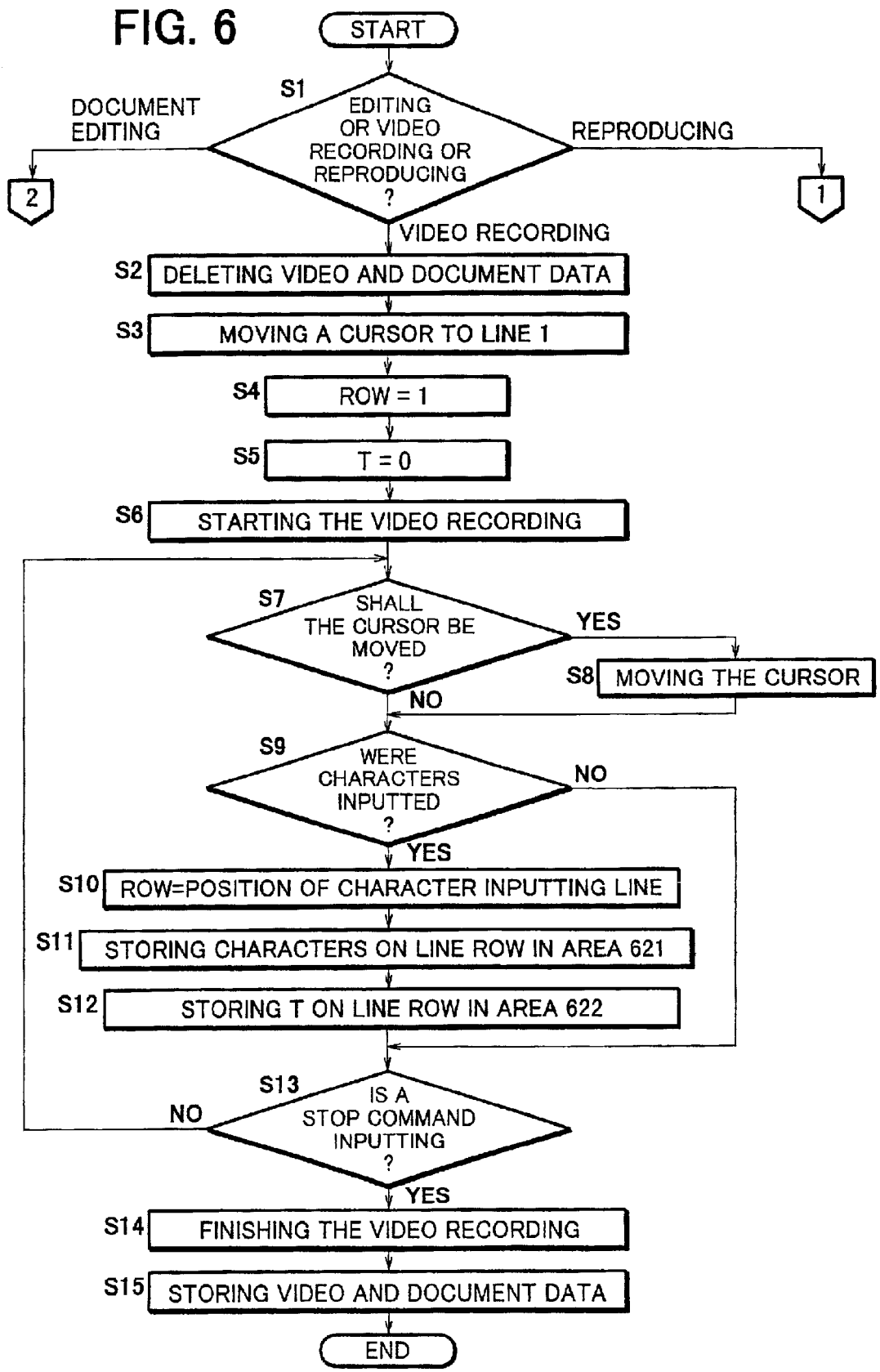
FIG. 6 is a flowchart depicting the operation of a recording and reproducing device according to the present invention.

FIG. 6 is a flowchart depicting the operation of the recording and reproducing device according to the present invention, which particularly illustrates the video recording processing operation to be executed under the control of the CPU 1. This flowchart illustrates the operation of the device in the state when the word processor application and the video recorder application are driven as illustrated in FIG. 3.

Figure 9:
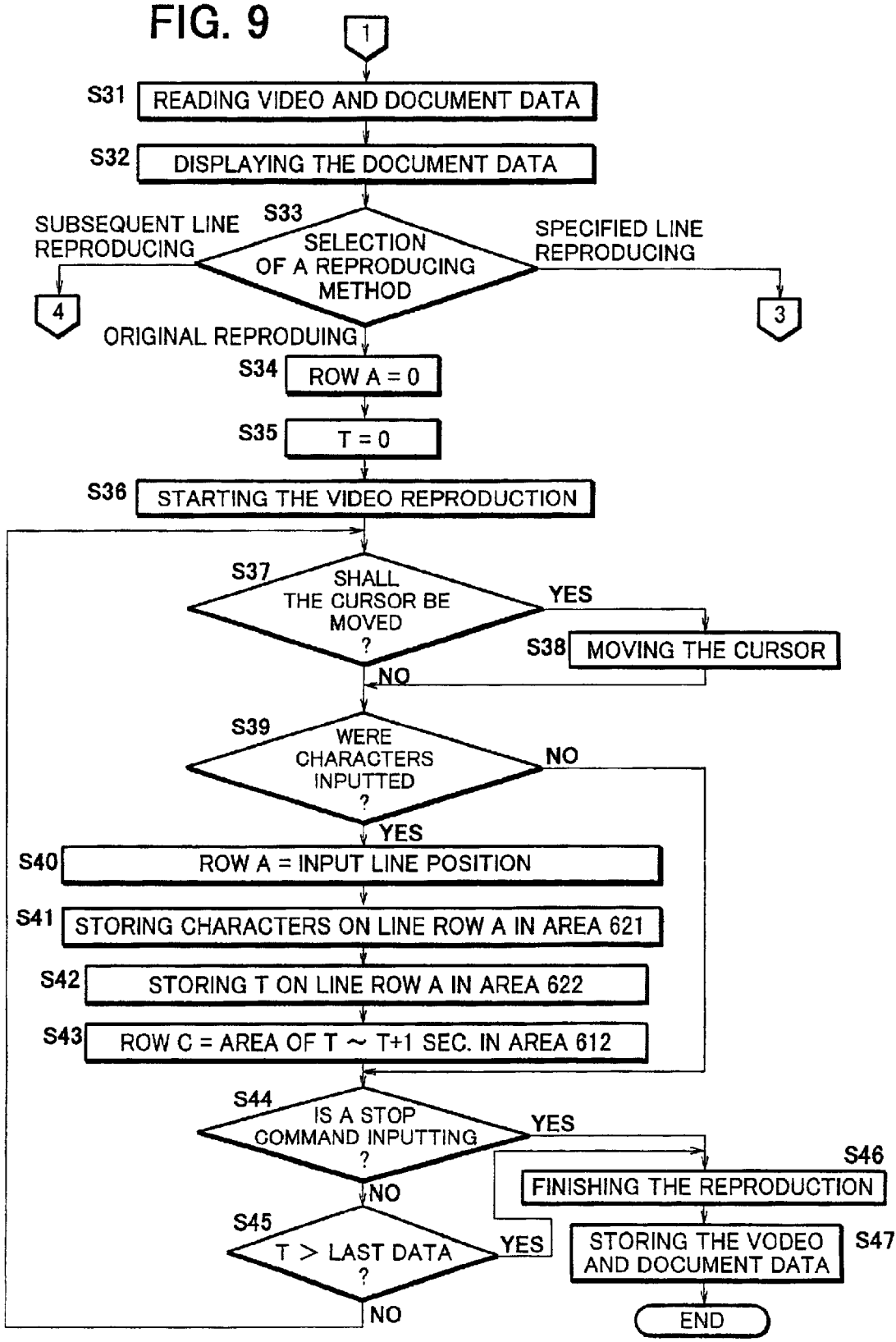
FIG. 9 is a flowchart depicting the operation of a recording and reproducing device according to the present invention.
Figure 15:
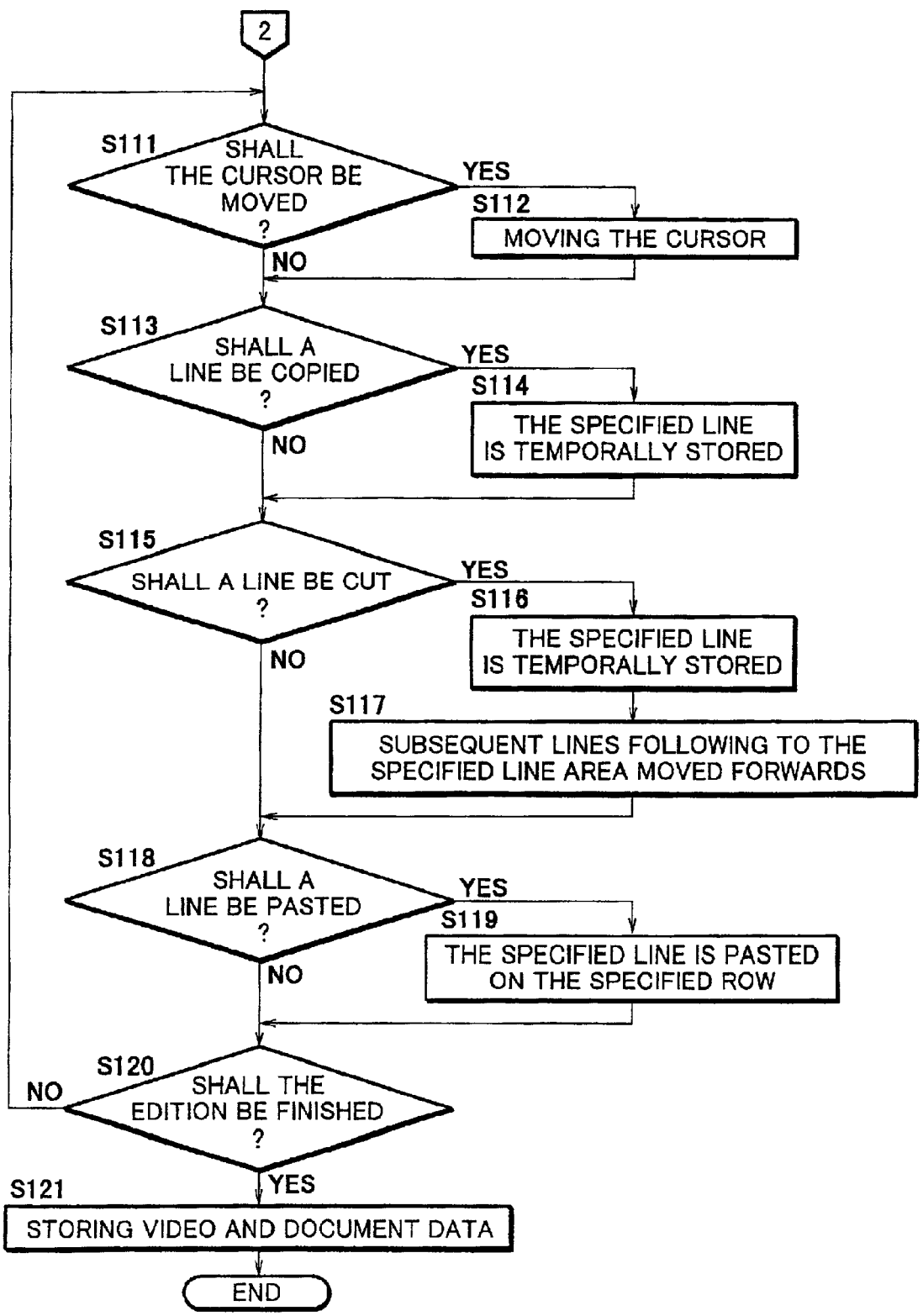
FIG. 15 is a flowchart depicting the operation of a recording and reproducing device according to the present invention.

Step S1, in response to user's instruction from the inputting portion 5, examines whether the required processing is the edition of a document or video recording or video reproduction. If the instruction for moving a cursor, cutting or pasting is input from the inputting portion 5, the CPU judges the document edition is requested and hence advances the procedure to Step S111 (FIG. 15). If the instruction is given by pointing the "video recording" button 23 within the control window, the procedure proceeds to Step S2 (FIG. 9). If the instruction is given by pointing the "play" button 22 within the control window, the procedure proceeds to Step S31 (FIG. 9).

In Step S2, the video data storage area 61 and the document data storage area 62 are initialized for initiating the recording of new video data. In Step S3, a cursor is transferred and indicated at an initial position (leftmost on line 1) on the display screen image.

In Step S4, a variable ROW representing a line (row) position of the cursor for inputting characters thereat is set to 1. In Step S5, a variable T representing a time elapsed from the beginning of video recording is set to 0. The variables are stored in the RAM 3.

Step S6 instructs the recording/reproducing portion 7 to begin the recording of video data. The recording/reproducing portion 7 operates independently from the CPU 1 in such a way that it receives video input from the video inputting portion 9, converts the video into digital data and sequentially stores the digitized data in a specified area (designated by the variable value T) of the unit-time video data storage area 611. The recording/reproducing portion 7 starts the recording of video data, generating a specific interrupt signal to the CPU 1 at intervals of a unit time (0, 1, 2, . . . seconds after the beginning the recording of video data in this instance). The CPU 1, in response to the interrupting signal, performs the interrupt operation to be described later in detail with reference to FIG. 7.

Step S7 examines whether an instruction to move the cursor was input from the inputting portion 5. If so, the cursor is moved in Step S8. Then, the procedure advances to Step S9 to examine whether characters were input from the inputting portion or not. If so, the procedure advances to Step S10. If not, the procedure proceeds to Step S13.

In this embodiment, inputting a character causes the cursor to move rightward by one character and it cannot be realized when the cursor locates at the right end of that line. Alternatively, inputting a character with the cursor placed at the right end on the screen image may cause a whole screen image to be scrolled leftward. When a "carriage return" key (an "enter" key) is pushed, the cursor moves to the beginning column of a next line (row).

In Step S10, the variable Row is set to a value corresponding to the current position of the cursor. In Step S11, character data inputted is stored in a predetermined area (i.e., an area corresponding to a line position specified by the variable value Row) of the document data storage area 621.

In Step S12, a current value of the variable T is stored in a predetermined area (i.e., an area corresponding to a line position specified by the variable Row) of the line-corresponding video position storage area 622.

Step S13 examines whether the "stop" button 21 in the control window 20 was pointed or not. If not, the procedure returns to Step S7. When the button 21 was pointed, the procedure proceeds to Step S14.

Step S14 instructs the recording/reproducing portion 7 to stop the recording of video data. Step S15, in response to instruction from the "register" button 27, registers the data stored in the video data storage area 61 and document data storage area 62 into the recording medium 10, finishes the processing (for video recording) and returns the procedure to START.

Figure 7:
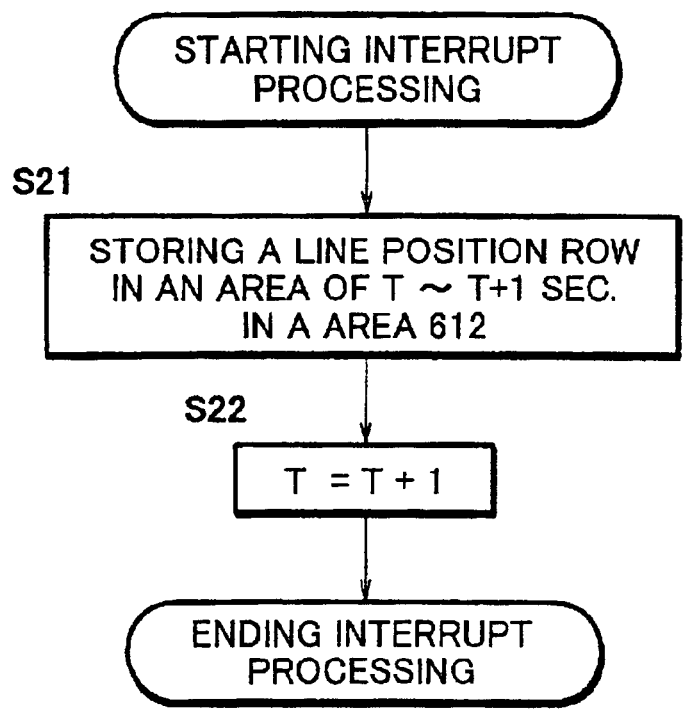
FIG. 7 is a flowchart depicting the operation of a recording and reproducing device according to the present invention.

FIG. 7 is a flowchart depicting the operation of the recording and reproducing device according to the present invention, which particularly concerns the interrupt operation during the video recording process under the control of the CPU 1. This flowchart illustrates the operation of the device, which is performed in response to a specified interrupt signal to be outputted at a constant time-interval after beginning of recording video data by the recording/reproducing portion 7 in Step S6 of the flowchart of FIG. 6.

In Step S21, a value of the variable Row is stored in a specified area (i.e., an area specified by the variable T) of the unit-time corresponding line position storage area 612. For example, when the variable T has a value of 0 and the variable Row has a value of 1, a value of 1 is stored in an area "line position corresponding to 0–1 sec." of the storage area 612 shown in FIG. 2.

In Step S22, the value of the variable T is increased by 1, whereby the interrupt processing is finished and the procedure returns to the processing that was performed before the interrupt operation.

By repeating Steps S7 to S13 of FIG. 6 and Steps S21 to S22 of FIG. 7 respectively, it is realized to store each character string inputted during the video recording operation with reference to its line position (row number) corresponding to the video recording position at that time point.

Figure 8:
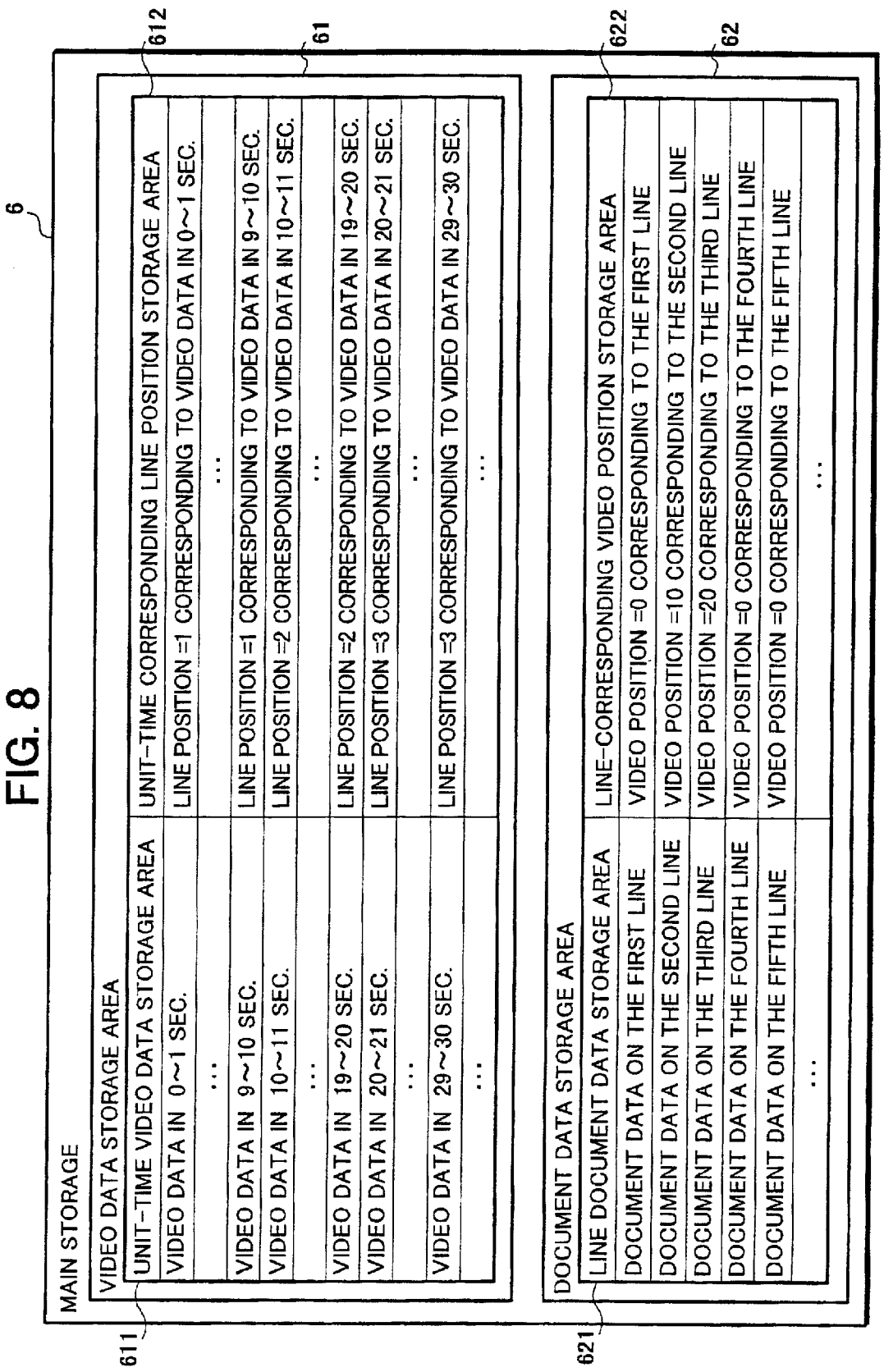
FIG. 8 illustrates a detailed content of a main storage 6.

For example, when a character string was input on the second and third lines respectively in 10 and 20 seconds after pressing the "video recording" button 23 and the "stop" button was pressed with an elapse of 30 seconds after the same time point, 1 is stored in an area of "line position corresponding to 0–1 sec." to an area of "line position corresponding to 9–10 sec." 2 is stored in an area of "line position corresponding to 10–11 sec." to an area of "line position corresponding to 19–20 sec." and 3 is stored in an area of "line position corresponding to 20–21 sec." to an area of "line position corresponding to 29–30 sec." of the unit-time-corresponding line position storage area 612 as shown in FIG. 8. At the same time, 0 is stored in an area of "video position corresponding to the first line (row)", 10 is stored in an area of "video position corresponding to the second line" and 20 is stored in an area of "video position corresponding to the third line" of the line-corresponding video position storage area 622.

Figure 10:
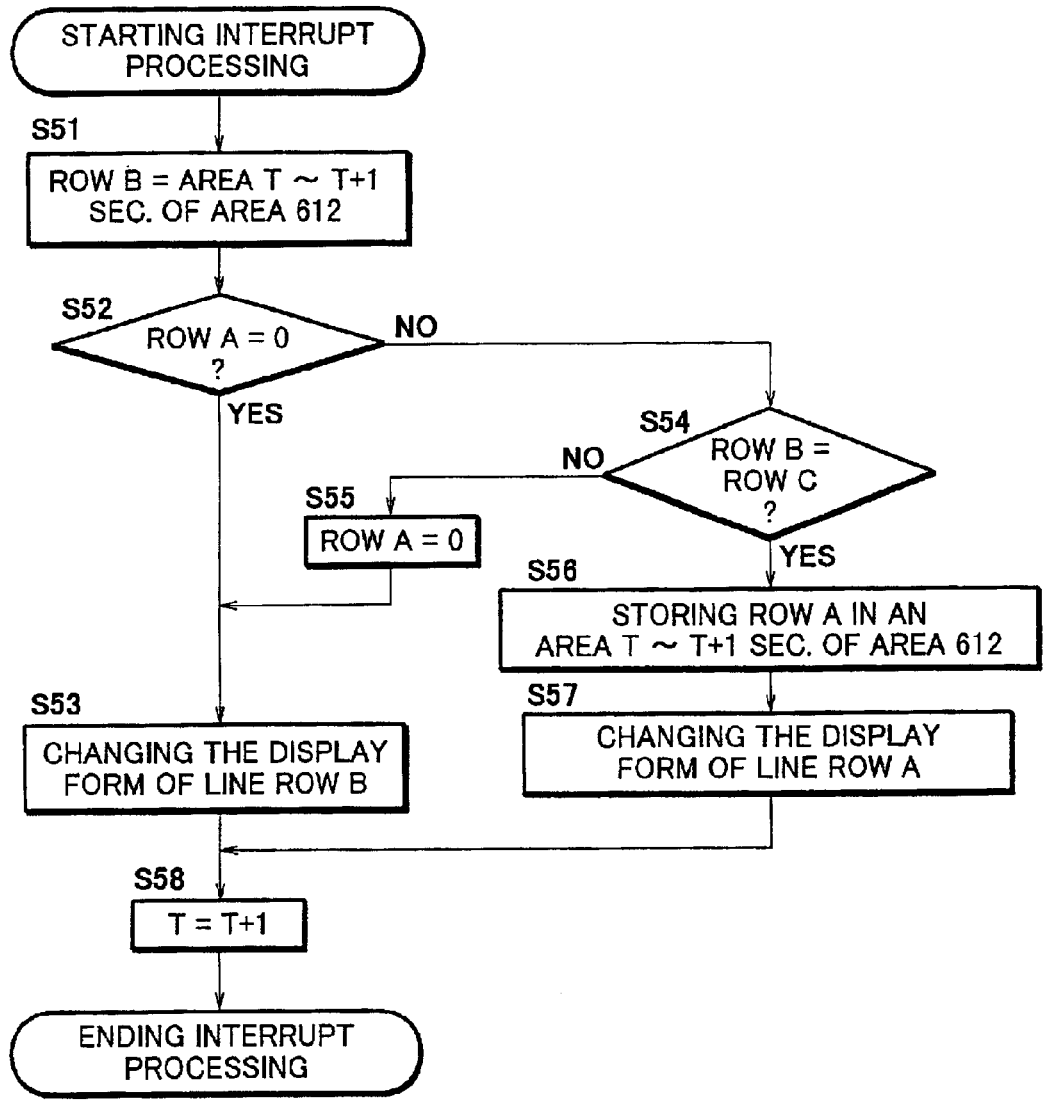
FIG. 10 is a flowchart depicting the operation of a recording and reproducing device according to the present invention.

FIGS. 9 and 10 are flowcharts depicting the video reproducing procedure of the recording and reproducing device according to the present invention, when recorded video data is displayed without any edition (without changing order) and under the control of the CPU 1. This flowchart illustrates the processing steps following Step S1 of FIG. 6, where it was judged that the "play" button 22 was selected.

The flowcharts of FIGS. 9 to 10 may be summarized as follows: Once video data reproduction was started, the lines related with a unit time elapsed from the beginning of the video reproduction is displayed in the form different form other lines. For example, where the video data and document data have been stored as shown in FIG. 8, the first line corresponding to 10 sec. from the beginning of reproducing the video data is displayed in a changed form, the second line for a period from 10 to 20 sec. is displayed in a changed form and the third line for a period of 20 to 30 sec. is displayed in a changed form.

Figure 11:
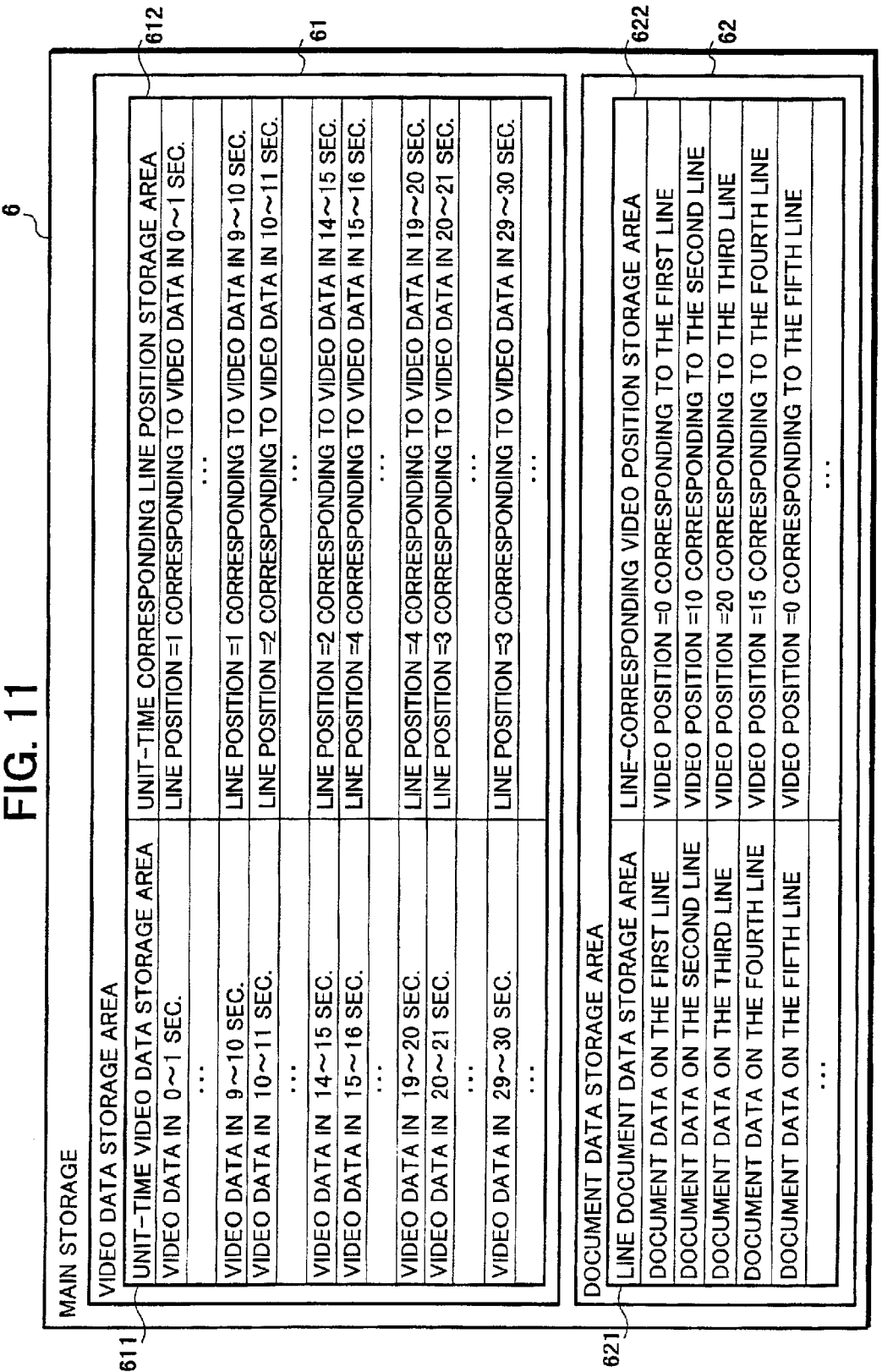
FIG. 11 illustrates a detailed content of a main storage 6.

When the user moved a cursor to a desired position and started inputting characters during the video reproduction, the CPU 1 stores the line position of the character string inputted thereon with a new reference to video data. When, in the example of the video and document data stored as shown in FIG. 8, the inputting of characters was started on the fourth line pointed by the cursor after 15 seconds of the video reproduction, the CPU 1 stores 4 in an area of "line position corresponding to a period from 15 to 16 sec." through an area of "line position corresponding a period from 19 to 20 sec." of the video data storage area 61 and document data storage area 62 respectively as shown in FIG. 11.

Now, the detail of the flowcharts 9 and 10 is described below. In Step S31, the video data and the document data are read from the recording medium 10 and stored in the video data storage area 61 and document data storage area 62 respectively. This step is omitted if the video data and the document data have been already stored in the video data storage area 61 and document data storage area 62 respectively.

In Step S32, the document data stored in the document data storage area 62 is displayed on the display portion 4 for example as shown in FIG. 4.

In Step S33, the CPU 1 requests the user to select one of three reproducing methods, i.e., "original", "specified lines" and "subsequent lines" reproduction modes. In the "original" reproduction mode, the video data recorded is displayed in the original order from the first frame. In the "specified line" reproduction mode, video data of a unit-time range corresponding to a character line on the display screen of the display portion 4, which line was specified by the user, is reproduced. In the "subsequent lines" reproduction mode, video images of subsequent unit-time ranges corresponding to respective subsequent character lines (1, 2, 3, . . . , n) are subsequently reproduced in the above described line order. The procedure, in response to the user's selection of "original" or "specified line" or "subsequent lines" reproduction mode, proceeds to Steps S34 or S61 (FIG. 12) and S91 (FIG. 14) respectively.

In Step S34, the variable RowA representing a line position pointed by cursor at the time of inputting characters is set to 0. In Step S35, the variable T representing a time elapsed after the beginning of recording video data is set to 0.

In Step S36, the recording/reproducing portion 7 is instructed to start the reproduction of the video data from a position specified by the variable T. The recording/reproducing portion 7 operates independently from the CPU 1 and sequentially reads video data from a specified area (designated by the variable value T) of the unit-time video data storage area 611 and outputs the data to the video data outputting portion 8.

The recording/reproducing portion 7 generates a specific interrupt signal at constant intervals (i.e., after 0, 1, 2, . . . second reproduction) after the beginning of video reproduction and sends it to the CPU 1. The CPU 1, in response to each interrupt signal from the recording/reproducing portion 7, performs the predetermined interrupt processing to be described later in detail with reference to FIG. 10.

Then, the procedure advances to Step S37 to examine whether an instruction of moving a cursor was inputted from inputting portion or not. If so, the procedure advances to Step S38 to move the cursor, and then proceeds to Step S39.

Step S39 examines whether characters were inputted from the inputting portion 5. If so, the procedure proceeds to Step S40. If not, the procedure proceeds to Step S44. In Step S40, the variable RowA is substituted with the line position whereat characters were inputted. In Step S41, the character data inputted is stored in a specified area (an area corresponding to a line position represented by the variable value RowA) of line document-data storage area 621. In Step S42, a current value of the variable T is stored in a specified area (an area corresponding to a line position represented by the variable value RowA) of line-corresponding video-data storage area 622. In Step S43, the variable RowC is substituted with a value stored in a specified area (an area corresponding to a value of variable T) of the unit-time corresponding line position storage area 612.

Step S44 examines whether the "stop" button 21 in the control window 20 was operated by the user. If that button was pressed, the procedure proceeds to Step S46 to instruct the recording/reproducing portion 7 to stop the video reproducing operation. Step S47, in response to instruction from the "register" button 27, resisters the data stored in the video-data storage area 61 and the document data storage area 62 to the recording medium 10, finishes the processing (original reproduction procedure) and returns the procedure to START.

Step S45 examines whether the value of the variable T exceeds an amount of data stored in the video data storage area 61 (whether video data is stored in an area specified by the variable T in the unit-time video data storage area 611). If not, the procedure returns to Step S37. If the variable value T exceeds the video data amount, the procedure proceeds to Step S46.

FIG. 10 is a flowchart depicting the operation of the recording and reproducing device, particularly concerning the interrupt operation made during the original video reproduction by the device under the control of the CPU 1. The flowchart is performed in response to specified interrupt signal to be generated at constant time intervals after beginning the video reproduction by the recording/reproducing portion 7 at Step S36 of FIG. 9.

In Step S51, the variable RowB which value represents a line position corresponding to a time position of a video data being reproduced is substituted with a value stored in a specified area (an area corresponding to a value of the variable T) of the unit-time corresponding line position storage area 612. For example, when the variable T has a value 0, a value (e.g., 1) stored in an area of "line position corresponding to a period of 0–1 seconds" of the unit-time-corresponding line-position storage area 612.

In Step S52, the variable RowA is examined whether its value is zero. If it is zero, the procedure advances to S53. If it is not zero, the procedure proceeds to Step S54. In Step S53, a character string on a line or an entire line designated by the value of the variable RowB is displayed in a particular form (e.g., shaded form) different from other lines. This enables the user to recognize characters (e.g., an explanatory sentence or a title) corresponding to a video image being reproduced on the display screen.

On the other hand, Step S54 discriminates whether a value of the variable RowB coincides with that of the variable RowC. If the variables have not the same value, 0 is substituted into the variable RowA and then the procedure proceeds to Step S53. If the variables have the same value, the procedure proceeds to Step S56.

In Step S56, the value of the variable RowA is stored in a specified area (an area designated by the value of the variable T) of the unit-time corresponding line position storage area 612. In Step S57, a character string on a line or an entire line designated by the variable value RowA is displayed in a particular form (e.g., shaded form) different from other lines.

Step S58 increases the value of the variable T is increased by 1, finishes the interrupt processing and then returns to the processing that was performed before the beginning of the interrupt processing.

By doing the above processing, a line of characters related by its time position to the video data being displayed can be displayed as distinguished from other lines. It is also realized to store the position of a line on which the user inputted characters during the reproduction of video data by moving the cursor so that the line position can be newly related with the video data being displayed on the display screen.

Figure 12:
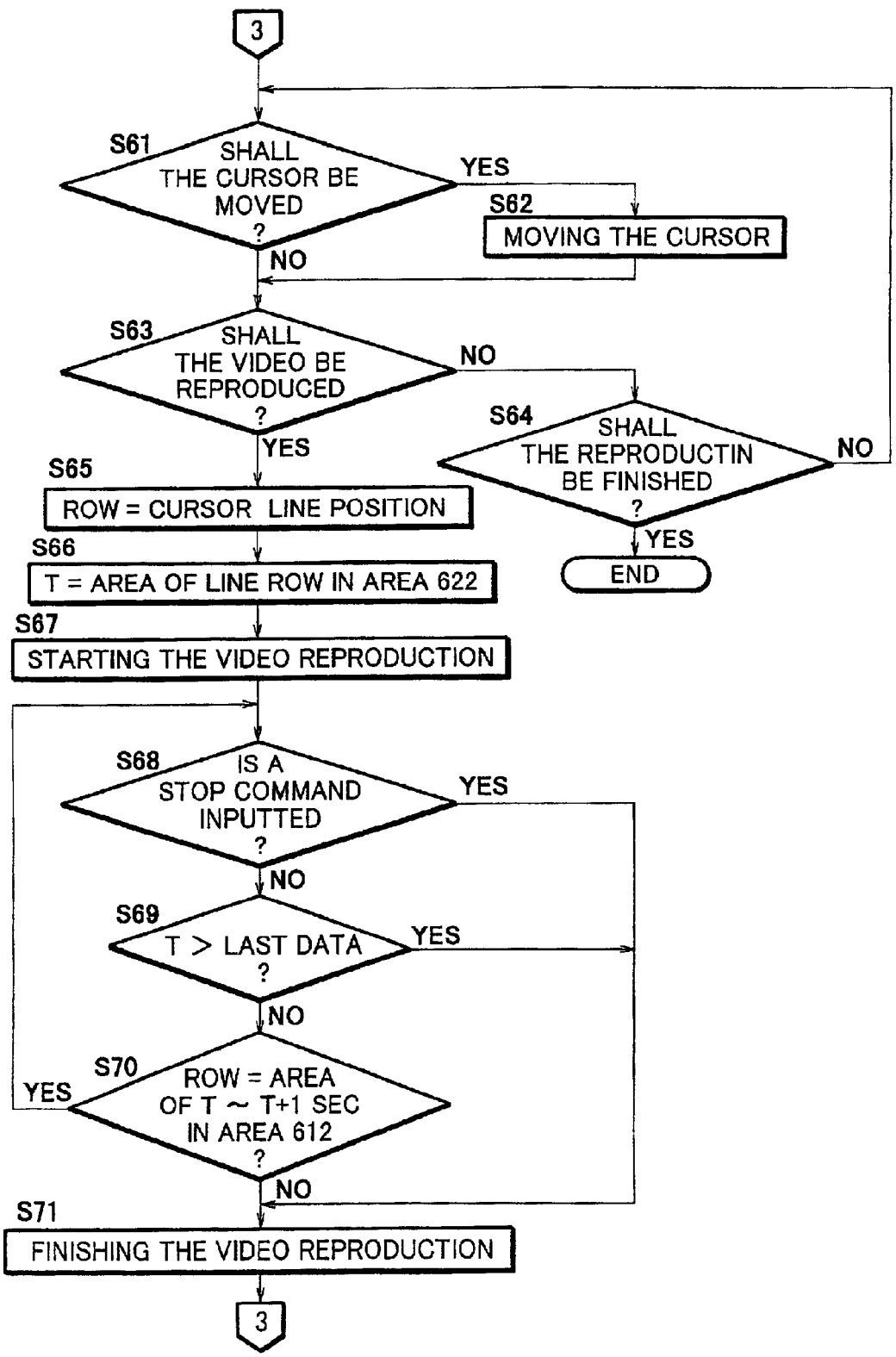
FIG. 12 is a flowchart depicting the operation of a recording and reproducing device according to the present invention.

FIG. 12 is a flowchart depicting the operation of the recording and reproducing device when the user designated any one of lines to reproduce video data from a portion related to the designated line under the control of the CPU 1. The flowchart illustrates a procedure after the specified line reproduction mode was selected in Step S33 of FIG. 9.

Step S61 discriminates whether an instruction to move the cursor was inputted from the inputting portion 5. If so, the cursor is moved to a designated position (Step S62) and, then, the procedure advances to Step S63.

Step S63 discriminates whether the "play" button 22 in the control window 20 was selected by a pointing device. If the button 22 was selected, the procedure proceeds to Step S65. If not, the procedure proceeds to Step S64 to discriminate whether a "finish" instruction was inputted from the inputting portion 5. If the "finish" command was inputted, the processing (for reproduction of video data from the specified line position) is finished and the procedure returns to START. If no instruction was inputted, the procedure returns to Step S61.

In Step S65, a current position of the cursor is input into the variable Row. In Step S66, the variable T is substituted with a value stored in a specified area (i.e., an area specified by a value of the variable Row) of the line-corresponding video position storage area 622. For example, when the user moves the cursor to the second line and pressed the "play" button 22, the variable Row is substituted with 2 and the variable T is substituted with 10.

Step S67 instructs the recording/reproducing portion 7 to reproduce video data from the position designated by the variable value T. The recording/reproducing portion 7 operates independently from the CPU 1 and sequentially reads data from a specified area (i.e., an area designated by the variable value T) of the unit-time video data storage area 611 and continues outputting the data to the video data outputting portion 8 until the last data is read or the "stop" instruction is given.

The recording/reproducing portion 7 generates a specific interrupt signal at constant time intervals (i.e., after 0, 1, 2, . . . second reproduction) after the beginning of video reproduction and sends it to the CPU 1. The CPU 1, in response to each interrupt signal from the recording/reproducing portion 7, performs the predetermined interrupt processing to be described later in detail with reference to FIG. 13.

Step S68 discriminates whether the "stop" button 21 in the control window 20 was pressed. If the button was operated, the procedure proceeds to Step S70. Step S69 discriminates whether the current value of the variable T exceeds the amount of data stored in the video data storage area 61 (whether video data is stored in an area specified by the variable T in the unit-time video-data storage area 611). If the variable value T exceeds the video data amount, the procedure proceeds to Step S71.

Step S70 discriminates whether the value stored in a specified area (i.e., an area specified by the variable T) of the unit-time corresponding line position storage area 612 is equal to the value of the variable Row. If so, the procedure returns to Step S68. If not, the procedure proceeds to Step S71. Alternatively, the procedure may always return to Step S68 by omitting the discrimination step S70.

Step S71 instructs the recording/reproducing portion 7 to stop the video reproducing operation. The procedure returns to Step S61.

Figure 13:
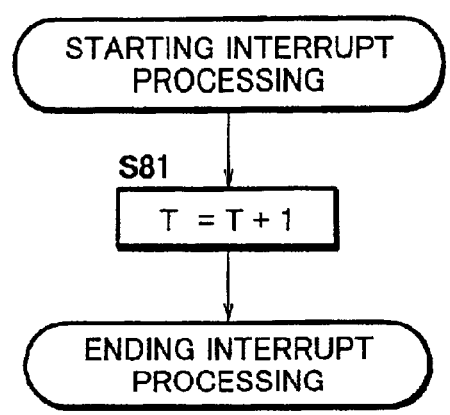
FIG. 13 is a flowchart depicting the operation of a recording and reproducing device according to the present invention.

FIG. 13 is a flowchart depicting the operation of the recording and reproducing device, particularly concerning the interrupt operation during the specified line video reproduction by the device under the control of the CPU 1. The flowchart is performed in response to specified interrupt signal to be generated at constant time intervals after beginning the video reproduction by the recording/reproducing portion 7 at Step S67 of FIG. 12.

Step S81 increases the variable value T by 1, finishes the interrupt processing and returns to the processing that was performed before the interruption.

As described above, the processing of FIGS. 12 and 13 enables the reproduction of video data starting from a desired position by designating by the user a line containing a desired character string.

Figure 14:
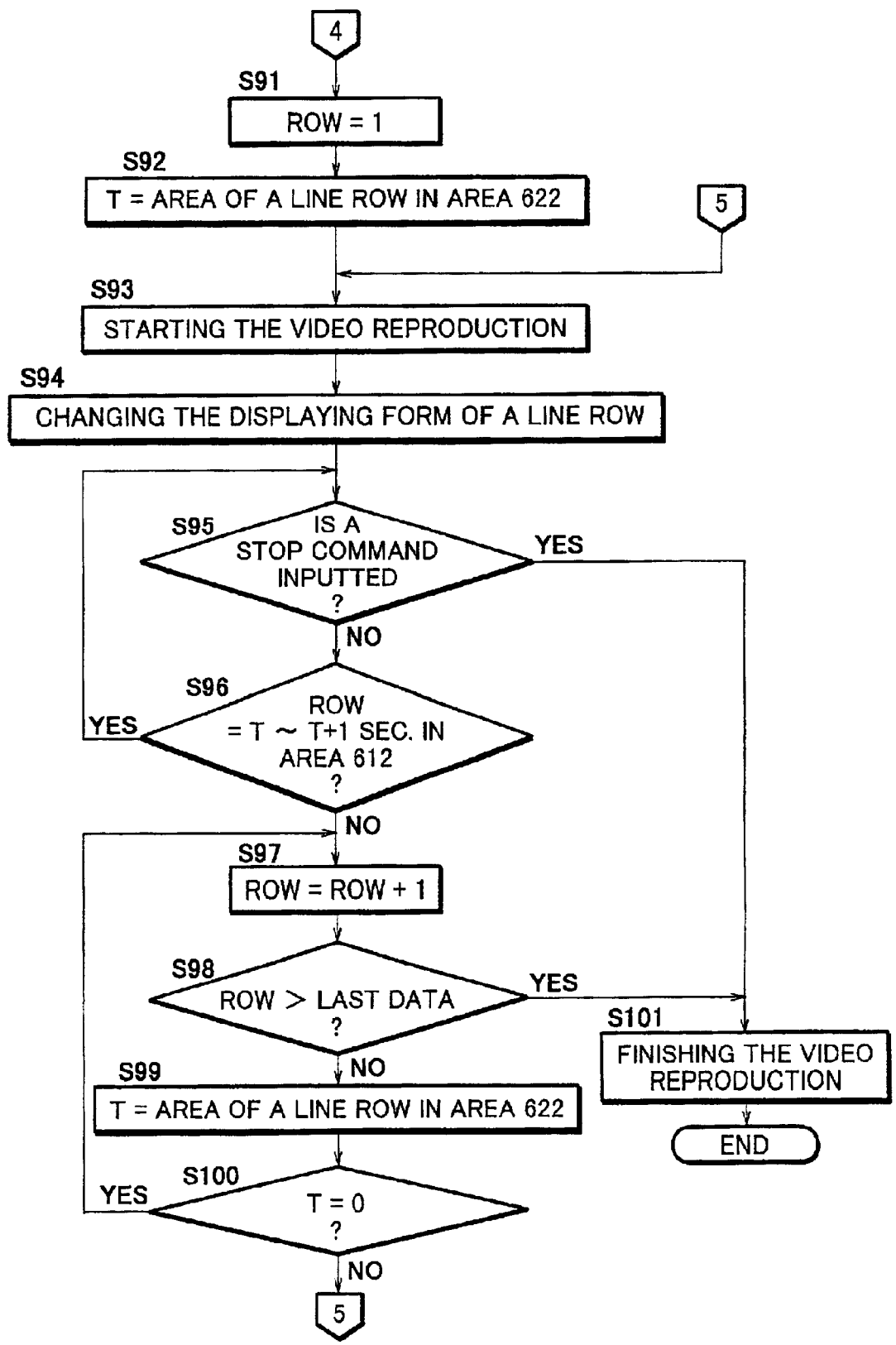
FIG. 14 is a flowchart depicting the operation of a recording and reproducing device according to the present invention.

FIG. 14 is a flowchart depicting the operation of the recording and reproducing device under the control of the CPU 1, which is the reproduction of video data in the sequential line order from the position corresponding to the first line. The flowchart illustrates a procedure after the subsequent line reproduction mode was selected in Step S33 of FIG. 9.

In Step S91, the variable Row is substituted with 1. When it is desired to start the reproduction of the video data from a mid-line (e.g., not from the first line but from the second or third line), a desired line value (i.e., 2 or 3) must be set at the variable Row in this step. In Step S92, the variable T is substituted with a value stored in a specified area (an area specified by the variable Row) of the line-corresponding video data storage area 622.

Step S93 instructs the recording/reproducing portion 7 to reproduce video data from the position designated by the variable value T. The recording/reproducing portion 7 operates independently from the CPU 1 and sequentially reads data from a specified area (i.e., an area designated by the variable value T) of the unit-time video data storage area 611 and continues outputting the data to the video data outputting portion 8 until the last data is read or the "stop" instruction is given.

The recording/reproducing portion 7 generates a specific interrupt signal at constant intervals (i.e., after 0, 1, 2, . . . second reproduction) after the beginning of video reproduction and sends it to the CPU 1. The CPU 1, in response to each interrupt signal from the recording/reproducing portion 7, performs the predetermined interruption processing that is the same as described with reference to FIG. 13. Therefore, further description is omitted.

In Step S94, characters in a line or a whole line, which position is specified by a value of the variable Row, is displayed as distinguished, e.g., with shading, from other lines.

Step S95 discriminates whether the "stop" button 21 in the control window 20 was pushed. If the button was selected, the procedure proceeds to Step S101. Step S101 instructs the recording/reproducing portion 7 to stop the video reproduction, then finishes the processing (continuous line reproduction mode) and then returns the procedure to START.

Step S96 discriminates whether the value stored in the specified area (designated by the variable T) of the unit-time-related line position storage area 612 is equal to that of the variable T. With the values equal to each other, the procedure returns to Step S95. If not, the procedure proceeds to Step S97. While the processing of Steps S95 to S96 is repeated, interrupt processing is executed at constant time intervals with an increment of 1 in the variable value Row per interruption.

In Step S97, the variable value Row is increased by 1. In Step S98, it is discriminated whether the value of the variable Row exceeds that of the last line of the document data. If so, the processing is transferred to Step S101 to finish the video reproduction processing.

Step S99 substitutes the variable T with a value stored in a specified area (an area specified by the variable Row) in the line corresponding video position storage area 622. Step S100 discriminates whether the variable value T is equal to zero. The processing returns to Step S97 when the variable T is zero and, if not zero, returns to Step S93 to start the reproduction of video data from the position specified by the variable value T.

Repeating Steps S91 to S100 realizes the subsequent video-data reproduction starting from respective video-data positions corresponding to line positions (in the sequential order beginning from the first line).

FIG. 15 is a flowchart depicting a procedure in particular for editing the document data on the line-by-line basis under the control of the CPU 1 by the recording and reproducing device according to the present invention. The flowchart illustrates a procedure following Step S1 in the flowchart of FIG. 6, whereat it is decided that the user selected the document edition mode.

Step S111 discriminates whether an instruction to move the cursor (by pressing a "Cursor Move" key, "Carriage Return" key or clicking the mouse) was input from the inputting portion 5. If so, the procedure proceeds to Step S112. If not, the procedure proceeds to Step S113.

In Step S112, the processing is made for moving the cursor and then proceeds to Step S113. The cursor can be moved freely within an area 26 for inputting and displaying document data. When the cursor is moved to the end of the area 26, the scroll processing of the displayed document is executed. The cursor is moved to the top column of the next line (row) when the "carriage return" key is pressed.

In Step S113, it is decided whether an instruction to copy a line from the inputting portion 5. With the instruction inputted, data stored in a specified area (an area corresponding to a current line pointed by the cursor) of the document data storage area (line document data storage area 621 and line-corresponding video position storage area 622) is temporally stored on the RAM 3 and then the processing proceeds to Step S115.

In Step S115, it is decided whether an instruction to cut (delete) a line was inputted from the inputting portion 5. In Step S116, in response to the instruction inputted, data stored in a specified area (an area corresponding to a current line position pointed by the cursor) of the document data storage area 62 (line document data storage area 621 and line-corresponding video position storage area 622) is temporally stored on the RAM 3 and the specified area (corresponding to the current cursor pointed line) of the document data storage area 62 is deleted while forwardly shifting following data by one line in Step S117. Then, the procedure proceeds to Step S118.

In Step S118, it is decided whether an instruction to paste a line (line pasting command) from the inputting portion 5. In Step S119, in response to the line pasting command inputted, the data temporally stored on the RAM 3 at Step S114 or S116 is inserted into a specified area (an area corresponding to a current line position pointed by the cursor) of the document data storage area 62 while shifting the subsequent data backwards by one line. Then, the procedure proceeds to Step S120.

In Step S120, it is decided whether an instruction to finish the edition (a finish command inputted by pressing the "register" button 27 or the "play" button) is inputted from the inputting portion 5. If not, the procedure returns to Step S111. When the command was inputted, the procedure proceeds to Step S121 whereat, in response to instruction inputted by pressing the "register" button 27, the video data stored in the video data storage area 62 and the document data storage area is registered onto the recording medium 10. The procedure (edition processing) ends and returns to START.

By repeating Steps S111 to S120, it is possible to designate any of lines being displayed on the display screen for edition by copying, cutting and pasting. Together with line document data, the line corresponding video data position is also copied, cut and pasted. This enables the user to change the order of reproducing video data, as described for subsequently reproducing lines, by changing the order of lines. Although line cutting and line pasting were described as independent operations, they may be done in combination with each other to realize the processing for transferring a line of characters. Although the above edition is conducted on the line-by-line basis, it may be done with a plurality of lines at a time.

The foregoing embodiments of the present invention are not restricted to the described contents and can be modified as far as such modification is within the spirit of the invention. For example, the above embodiments have been described for recording and reproducing video data but they may be modified for recording and reproducing audio signals. Namely, the specification of the embodiment can be modified by changing the terms "video" to "audio", "video recording" to "audio recording", "video outputting portion" to "audio outputting" and "video inputting portion" to "audio inputting portion". This may be made in the invention without departing from the spirit and scope thereof.

In the described embodiments, recorded positions of video data are stored with reference to corresponding lines of the document data. Alternatively, plural text boxes (graphical objects capable of storing characters) are used with reference to corresponding recorded positions of video data. Namely, the description of the above embodiments may be easily modified by changing wording, e.g., "the first line" to "the first text box", "designate a line" to "designate a text box", "cut and paste a line" to "cut and paste a text box". These changes may be made in the invention without departing from the spirit thereof.

The recording and reproducing device according to the present invention offers the following advantages:

When characters are inputted during recording or reproducing of video and audio data, the inputted character data is stored with reference to the recording or reproducing position of the video or audio data at the time point of inputting the character data. This enables the user to easily reproduce the video and audio data from any desired part by designating the corresponding line of the character data being displayed on the display screen.

The video and audio data thus stored can be displayed together with a corresponding character string recognized and distinguished. This may present to the user a character string representing a title or a summary of the video or audio data being currently reproduced.

The edition of thus stored characters per line by copying, cutting, pasting, etc. may be accompanied by automatic edition of positions of records of video or audio data, which positions were stored with reference to the corresponding character data, thus enabling the reproduction of edited video and audio data in the changed order. The edition of the video and audio information (copying, cutting, pasting, and moving) is made by editing corresponding character data, i.e., a title and summary of the content of the video and audio data. In this instance, the video data and the audio data are not directly edited and merely the information defining their positions is edited. Consequently, there is no need of processing a large amount of data and, therefore, the high-speed data processing can be achieved.

What is claimed is:

1. A recording and reproducing device comprising:
   a recording/reproducing means for recording video or audio data and reproducing the recorded data;
   an input area specifying means for specifying an area for inputting characters therein;
   a character inputting means for inputting characters in the area specified by the input area specifying means;
   a displaying means for displaying characters input by the character inputting means;
   a character inputting start detecting means for detecting the beginning of inputting characters by the character inputting means while recording or reproducing data by the recording/reproducing means; and
   a recording/reproducing position storing means for relationally storing: information indicating a position of recording/reproducing data by the recording/reproducing means at a time point of detection of the character inputting start by the character inputting start detecting means; a string of characters inputted by the character inputting means at that time point; and information indicating an area wherein the characters have been inputted, wherein the information indicating the position, the string of characters, and the information indicating the area are related with each other.

2. A recording and reproducing device as defined in claim 1, further comprising:
   a discriminating means for discriminating whether a character inputted by the character inputting means in relation with the position of video or audio data being displayed during the reproduction of recorded data by the recording/reproducing means and information defining the area wherein the character have been inputted are stored in the recording/reproducing position storing means; and
   a displaying form changing means whereby, when the discriminating means decided the presence of the information stored in the recording/reproducing position storing means, the character or the area is displayed differently in form from other characters or areas.

3. A recording and reproducing device as defined in claims 1, further comprising:

an area selecting means for selecting one of areas stored in the recording/reproduction position storing means; and a reproduction instructing means for instructing the recording/reproducing means to reproduce video or audio data from a recording/reproducing position stored with reference to a corresponding area selected by the area selects means.

4. A recording and reproducing device as defined in claim 3, wherein the area selecting means automatically selects one of areas stored in the record/reproduction position storing means one by one in the stored order.

5. A recording and reproducing device as defined in any one of claims 1 to 4, further comprising:

an edition instructing means for instructing edition by deleting a character stored in the record/reproduction position storing means or copying or transferring a character to another position thereof; and an editing means for deleting a character stored in the record/reproduction position storing means or copying or transferring a character to another position thereof in response to instruction from the edition instructing means and for deleting an information indicating the position corresponding to the deleted character in the record/reproduction position storing means or storing the copied/transferred character with reference to information indicating an area whereto the character has been copied/transferred.

6. A recording and reproducing device as defined in claim 2, further comprising: an area selecting means for selecting one of areas stored in the recording/reproduction position storing means; and a reproduction instructing means for instructing the recording/reproducing means to reproduce video or audio data from a recording/reproducing position stored with reference to a corresponding area selected by the area selects means.

* * * * *